July 23, 1929.  E. H. JOHNSON  1,721,864
HOSE REPAIR DEVICE
Filed Sept. 8, 1927

INVENTOR
ENOS H. JOHNSON
BY A. B. Bowman
ATTORNEY

Patented July 23, 1929.

1,721,864

UNITED STATES PATENT OFFICE.

ENOS H. JOHNSON, OF LOS ANGELES, CALIFORNIA, ASSIGNOR TO JOHNSON & WRIGHT, A COPARTNERSHIP COMPOSED OF GEORGE E. WRIGHT AND ENOS H. JOHNSON.

HOSE-REPAIR DEVICE.

Application filed September 8, 1927. Serial No. 218,136.

My invention relates to a device for repairing hoses, such as garden and other hoses.

The objects of my invention are: first, to provide a device of this class whereby a hole in a hose may be repaired effectively in a very few moments by an appliance on the exterior only without cutting or rupturing the hose and whereby the repaired portion of the hose will be as strong, or stronger, than the other portions thereof; second, to provide a device of this class which may be easily and quickly applied by a simple tool; third, to provide a device of this class which may be readily removed when desired; fourth, to provide a device of this class which may be readily folded around the ruptured part of the hose and secured in position therearound and which cannot of itself become unloosed, and which is so constructed that the securing portions cannot be readily distorted or worn; fifth, to provide a device of this class which is applicable to hoses of different diameters; sixth, to provide, as a whole, a novelly constructed device for repairing hose; and, seventh, to provide such a device which is simple and economical of construction, durable and which will not readily deteriorate or get out of order.

Figure 1:
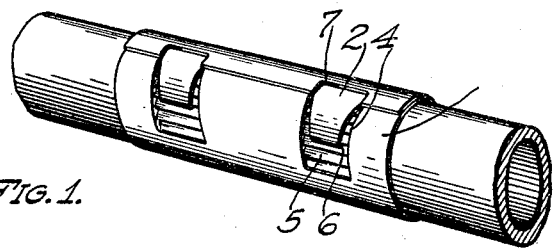
Figure 5:
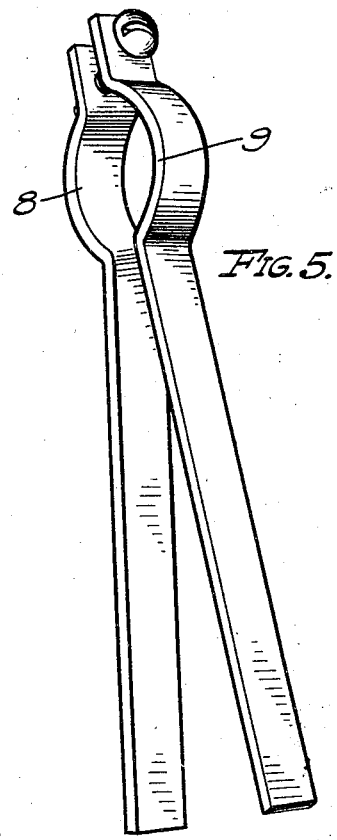
Figure 2:
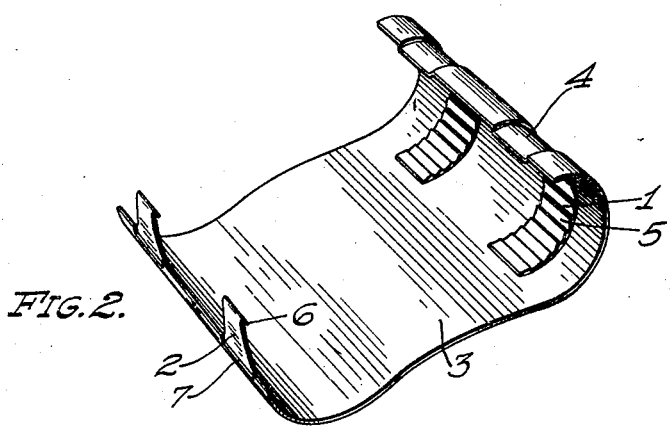
Figure 3:
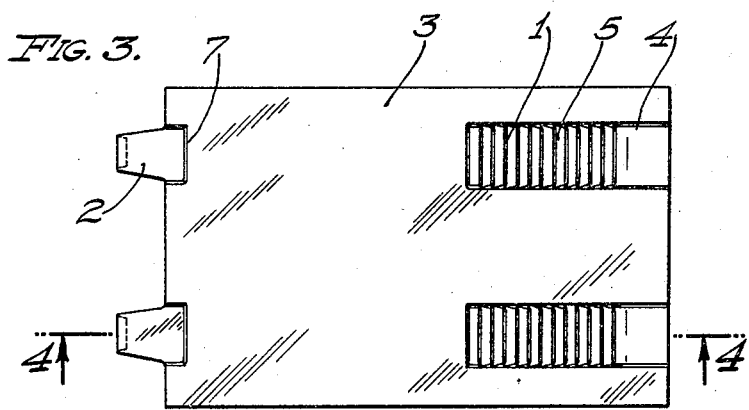
Figure 4:
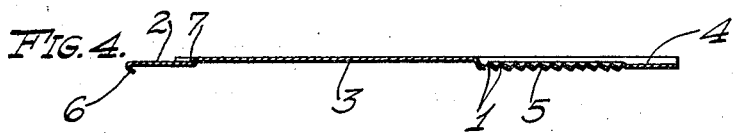

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon which form a part of this application in which:

Figure 1 is a fragmentary portion of a hose showing my device secured in position around a portion thereof for covering a ruptured portion thereof; Fig. 2 is a perspective view of my device partially unfolded and in the preferable commercial form; Fig. 3 is a plan view of my device wholly unfolded, but showing the formed and depressed hook and retaining slot portions thereof; Fig. 4 is a sectional view thereof, taken through 4—4 of Fig. 3; and, Fig. 5 is a perspective view of one form of an adjustable tool for fastening my repair device around a hose and for removing the same therefrom.

Like characters of reference refer to similar parts and portions throughout the several views of the drawings.

My hose repair device is made of a unitary piece of sheet metal, preferably galvanized sheet iron. This piece of sheet metal, when unfolded, is slightly longer in the direction extending around the hose than wide and is provided at one end with two rows of transverse notches formed by slots 1 and at the opposite end with a pair of hook members 2, both being preferably an integral part of the main plate portion 3. The slots 1 extend longitudinally with the device when rolled around the hose, as shown in Fig. 1. These slots are formed transversely of and in the bottom of shallow channels 4 which extend a considerable distance inwardly from one end of the plate and are depressed inwardly relative to the hose when positioned around the latter. The portions 5 intermediate the slots 1 are bent at angles for forming wide slots and inclined portions for receiving and retaining hooks 6 at the outer ends of the hook portions 2. The hook portions 2 are also depressed inwardly relative to the hose, and the inwardly depressed hook portions are carried inwardly to a slight distance beyond the end of the plate 3 at which the hook portions are positioned, as indicated by 7. These depressed hook portions, as well as the depressed portions at the base of the hook portions are adapted to seat in the channels 4, as shown best in Fig. 1, for positioning the hook portions relative to the slots and for positioning the hooks 6 and the outer ends of the hook portions 2 inwardly relative to the exterior surface of the device so that the securing portions or hook portions cannot be worn off readily when pulling the hose over a sidewalk, or the like, or to prevent the hook portions or the slotted portions from being readily distorted.

The slots 1 are spaced very slight distances apart circumferentially when the device is placed around a hose so that greater variation or adjustability is obtainable for different sizes of hoses, or for variously drawing up the device around the hose. A relatively large number of the slots 1 are provided so that the device is readily adaptable for different sizes of hoses.

In order to place and secure the repair device around a hose, the same is folded by hand reasonably tight around the hose so that the end with the hook portions and with the hooks directed inwardly overlapping the portion provided with the slots and the inclined hook retaining portions 5. The tool, shown in Fig. 5, is then gripped by one hand and positioned with its two jaws around the device, preferably to one side of the hook portions. The handles are then brought together and the hooks 6 directed into the nearest slot 1. The tool is then released and the other end of the device secured in the same manner.

The devices are preferably made commercially in the form shown in Fig. 2 so that a number of the devices may be nested into each other for economy of space.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims:

Having thus described my invention, what I claim as new and desire to secure by Letters Patent is:

1. In a hose repair device, a sheet metal member having at one end a pair of longitudinally spaced apart circumferentially extending channels extending a considerable distance inwardly from said end and spaced from each other and from the adjacent sides of said member, the bottoms of said channels having a plurality of transversely extending slots, the portions between said slots being twisted forming inclined hook retaining portions, the opposite end of said member having correspondingly longitudinally spaced apart depressed portions and hooks at the ends of the depressed portions adapted to be extended into said slots and to engage the undersides of the inclined retaining portions, said depressed portions being of such width, relative to the longitudinal extent of the device when folded around a hose, as to enter said channels.

2. In a hose repair device, a sheet metal member having at one end a row of circumferentially spaced apart longitudinally extending slots, the whole of the portions between said slots being twisted at an angle with the inner edges of said portions relative to said end of the member directed outwardly, the opposite end of said member having a hook portion extending beyond the opposite end of said member and provided at the end of said portion with a wide hook portion directed inwardly and backwardly at an angle corresponding to the angle of the portions between said slots, said hook portion, when said member is folded around a hose, extending over said slots with said hook directed into one of said slots and filling substantially the whole of the slot and with the ends of the hook portion positioned at the ends of the slot, said hook portion extending around the under side of one of said inclined portions at the inner edge relative to the end of the member at which the slots are positioned.

3. In a hose repair device, a sheet metal member having at one end a row of circumferentially spaced apart longitudinally extending slots, the portions between said slots being twisted at an angle with the inner edges of said portions relative to said end of the member directed outwardly, the opposite end of said member having a hook portion extending beyond the opposite end of said member and provided at the end of said portion with a hook directed inwardly and backwardly at an angle corresponding to the angle of the portions between said slots, said hook portion, when said member is folded around a hose, extending over said slots with said hook directed into one of said slots and around the under side of one of said inclined portions at the inner edge relative to the end of the member at which the slots are positioned, said slots and the portions intermediate said slots being formed in the bottom of a channel extending circumferentially from one end of said member and depressed inwardly relative to the normally outer surface of said member, said hook portion being also depressed inwardly and adapted to be positioned within said channel.

4. In a hose repair device, a sheet member having at one end a plurality of circumferentially spaced notches and at the opposite end a hook adapted to be positioned over said notches and adapted to engage one of the same, the portions of said member provided with said notches being depressed inwardly beyond the normal outer surface of said member whereby said hook is positioned at its hook portion substantially flush with the normal outer surface of the member.

In testimony whereof I have hereunto set my hand at Los Angeles, California, this 31st day of August, 1927.

ENOS H. JOHNSON.